US006401026B2

(12) United States Patent
Robichaux et al.

(10) Patent No.: US 6,401,026 B2
(45) Date of Patent: Jun. 4, 2002

(54) COMPUTER READABLE STORAGE MEDIUM FOR CONTROLLING ENGINE TORQUE

(75) Inventors: Jerry Dean Robichaux, Riverview; Tobias John Pallett, Ypsilanti, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/891,488

(22) Filed: Jun. 25, 2001

Related U.S. Application Data (62) Division of application No. 09/370,234, filed on Aug. 9, 1999, now Pat. No. 6,279,531.

(51) Int. Cl.$^7$ ............................................. G06F 19/00
(52) U.S. Cl. .................. 701/110; 123/339.19; 701/102
(58) Field of Search ........................... 123/339.19, 361; 701/102, 110

(56) References Cited

U.S. PATENT DOCUMENTS

| 4,353,272 A | 10/1982 | Schneider et al. |
| 4,697,561 A | 10/1987 | Citron |
| 4,730,708 A | 3/1988 | Hamano et al. |

(List continued on next page.)

FOREIGN PATENT DOCUMENTS

| AU | B-66831/81 | 1/1986 |
| EP | 0 206 091 B1 | 12/1986 |
| EP | 0 340 764 A2 | 11/1989 |
| EP | 0 413 031 B1 | 4/1994 |
| EP | 0 408 767 B1 | 7/1994 |
| EP | 0 557 299 B1 | 8/1994 |
| EP | 0 754 888 A2 | 1/1997 |
| EP | 0 749 524 B1 | 5/1998 |
| GB | 2 154 763 A | 9/1985 |
| GB | 2 239 500 B | 7/1991 |
| GB | 2 239 683 A | 7/1991 |
| GB | 2 312 970 A | 11/1997 |
| WO | WO 95/01502 | 1/1995 |

OTHER PUBLICATIONS

"Hierarchical Control Strategy of Powertrain Functions", by H.M. Streib et al, 24 Fisita Congress, London Jun. 7–11, 1992, pp. 1–11.

"Torque–Based System Structure of the Electronic Engine Management System (ME7) as a New Base for Drive Train Systems", by J. Gerhardt et al, 6. Aachener Kolloquim Fahrzeug–und Motorentechnik '97, Oct. 22, 1997, pp. 817–849.

\* cited by examiner

*Primary Examiner*—John Kwon
(74) *Attorney, Agent, or Firm*—John D. Russell; Allan J. Lippa (57) ABSTRACT

A computer readable storage medium having instructions for controlling an engine includes instructions for determining a desired engine brake torque and modifying the desired engine brake torque based on current engine operating conditions to determine a requested engine brake torque prior to determination of control parameters, including at least one of an airflow and a fuel quantity, to effect the requested engine brake torque. Preferably, the desired engine brake torque is modified by combining the desired engine brake torque with an idle speed torque to generate a first intermediate torque, comparing the first intermediate torque to an actual engine brake torque to generate a second intermediate torque, generating a feedback correction torque based on the second intermediate torque, and combining the first intermediate torque, the feedback correction torque, and a third intermediate torque to determine the requested engine brake torque.

10 Claims, 4 Drawing Sheets

U.S. PATENT DOCUMENTS

| | | |
|---|---|---|
| 4,739,483 A | 4/1988 | Ina et al. |
| 4,819,596 A | 4/1989 | Yasuoka et al. |
| 4,951,627 A | 8/1990 | Watanabe et al. |
| 5,069,181 A | 12/1991 | Togai et al. |
| 5,078,109 A | 1/1992 | Yoshida et al. |
| 5,086,668 A | 2/1992 | Fujiwara et al. |
| 5,109,732 A | 5/1992 | Takizawa |
| 5,245,966 A | 9/1993 | Zhang et al. |
| 5,253,623 A | 10/1993 | Melnyk et al. |
| 5,304,102 A | 4/1994 | Narita et al. |
| 5,325,740 A | 7/1994 | Zhang et al. |
| 5,351,776 A | 10/1994 | Keller et al. |
| 5,374,224 A | 12/1994 | Huffmaster et al. |
| 5,383,432 A | 1/1995 | Cullen et al. |
| 5,398,544 A | 3/1995 | Lipinski et al. |
| 5,407,401 A | 4/1995 | Bullmer et al. |
| 5,408,966 A | 4/1995 | Lipinski et al. |
| 5,408,974 A | 4/1995 | Lipinski et al. |
| 5,431,139 A | 7/1995 | Grutter et al. |
| 5,437,253 A | 8/1995 | Huffmaster et al. |
| 5,445,125 A | 8/1995 | Allen |
| 5,462,501 A | 10/1995 | Bullmer et al. |
| 5,484,351 A | 1/1996 | Zhang et al. |
| 5,501,644 A | 3/1996 | Zhang |
| 5,503,129 A | 4/1996 | Robichaux et al. |
| 5,520,159 A | 5/1996 | Pao et al. |
| 5,568,795 A | 10/1996 | Robichaux et al. |
| 5,575,257 A | 11/1996 | Lange et al. |
| 5,588,178 A | 12/1996 | Liu |
| 5,603,672 A | 2/1997 | Zhang |
| 5,605,131 A | 2/1997 | Ohno et al. |
| 5,606,951 A | 3/1997 | Southern et al. |
| 5,628,706 A | 5/1997 | Zhang |
| 5,680,763 A | 10/1997 | Unland et al. |
| 5,692,471 A | 12/1997 | Zhang |
| 5,743,083 A | 4/1998 | Schnaibel et al. |
| 6,006,724 A | 12/1999 | Takahashi et al. |
| 6,109,236 A | 8/2000 | Takahashi et al. |
| 6,109,237 A | 8/2000 | Pels et al. |
| 6,144,913 A * | 11/2000 | Braun et al. ................ 123/352 |
| 6,219,611 B1 * | 4/2001 | Russell ........................ 123/399 |

Fig. 4

COMPUTER READABLE STORAGE MEDIUM FOR CONTROLLING ENGINE TORQUE

CROSS-REFERENCE TO RELATED APPLICATION

This application is a divisional of application Ser. No. 09/370,234, filed on Aug. 9, 1999, entitled "System And Method for Controlling Engine Torque", now U.S. Pat. No. 6,279,531 B1.

TECHNICAL FIELD

The present invention is directed to a computer readable storage medium for controlling engine torque using feedback and feed forward control.

BACKGROUND ART

Electronic airflow control systems, such as variable cam timing systems and electronic throttle control systems, replace traditional mechanical throttle cable systems with an "electronic linkage" provided by sensors and actuators in communication with an electronic controller. This increases the control authority of the electronic controller and allows the airflow and/or fuel flow to be controlled independently of the accelerator pedal position.

To control the actual output engine brake torque to achieve the driver demanded engine brake torque, it is desirable to calculate a corresponding desired airflow and fuel flow. Preferably, this computation accounts for variations in engine operating parameters, such as engine operating temperature and accessory losses.

Prior art approaches convert the desired engine torque to a desired airflow using a two-dimensional lookup table with inputs for desired torque and engine speed. However, such lookup tables are typically calibrated for stoichiometric operation and for maximum brake torque (MBT). The resulting desired airflow is then modified by a function which relates engine operating temperature and air/fuel ratio to engine torque to generate a modified or corrected airflow. The corrected desired airflow is then achieved via an appropriate airflow rate controller. This approach may be seen by reference to U.S. Pat. Nos. 5,351,776 and 5,383,432, for example.

While the prior art approaches may be acceptable for many applications and operating conditions, it is desirable to provide a more robust engine torque controller which improves powertrain performance for current applications and is more amenable to new engine technologies and control strategies such as direct injection, lean burn, variable cam timing, and variable displacement applications.

SUMMARY OF THE INVENTION

It is an object of the present invention to provide a computer readable storage medium having stored data representing instructions for controlling engine torque in an engine having electronically controlled airflow and/or fuel flow.

Another object of the present invention is to provide engine torque control which more accurately compensates for current operating conditions such as additional frictional losses when the engine is cold and for variable accessory losses which correct for variations between desired and actual torque using a torque feedback signal.

In carrying out the above object and other objects, advantages, and features of the present invention, a computer readable system and method for controlling engine torque includes instructions for determining a desired engine brake torque based on accelerator pedal position, barometric pressure, and speed; instructions for adjusting the desired engine brake torque to generate a requested engine brake torque based on current operating conditions; and instructions for controlling at least one operating parameter of the engine based on the requested engine brake torque to deliver the desired engine brake torque. Preferably, the desired engine brake torque is modified by combining the desired engine brake torque with an idle speed torque to generate a first intermediate torque, comparing the first intermediate torque to an actual engine brake torque to generate a second intermediate torque, generating a feedback correction torque based on the second intermediate torque, and combining the first intermediate torque, the feedback correction torque, and a third intermediate torque to determine the requested engine brake torque, where the third intermediate torque represents accessory load or a frictional torque loss which varies with temperature.

The present invention provides a number of advantages over prior art control strategies. The present invention compensates the input to the engine torque controller prior to determination of the control parameters, such as airflow and fuel flow, rather than modifying the output of the engine torque controller as described in the prior art. This provides a more robust torque controller which is more easily applied to various engine technologies.

The above advantages and other advantages, objects, and features of the present invention, will be readily apparent from the following detailed description of the best mode for carrying out the invention when taken in connection with the accompanying drawings.

BEST MODE FOR CARRYING OUT THE INVENTION

Figure 1:
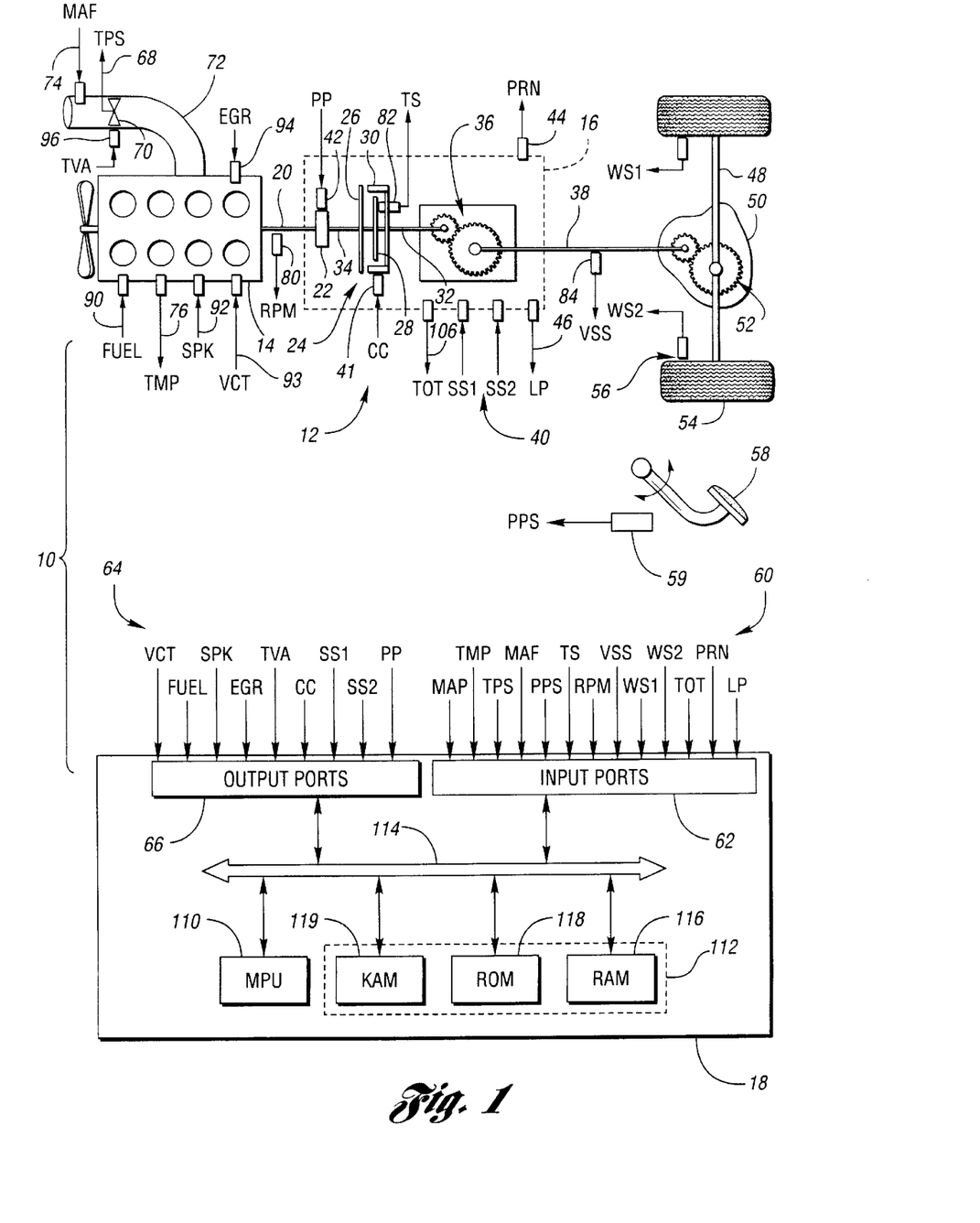
FIG. 1 is a block diagram illustrating a system and method for controlling engine torque according to the present invention.

FIG. 1 provides a block diagram illustrating operation of a system or method for controlling engine torque according to the present invention.

System 10 includes a vehicular powertrain 12 having an internal combustion engine 14 coupled to an automatic transmission 16. Of course, the present invention is equally applicable to manual transmission applications. Powertrain 12 may also include a controller 18 in communication with engine 14 and transmission 16 for providing various information and control functions. Engine 14 is connected to transmission 16 via crankshaft 20 which is connected to transmission pump 22 and/or torque converter 24. Preferably, torque converter 24 is a hydrodynamic torque converter including a pump or impeller 26 which is selectively fluidly coupled to a turbine 28. Torque converter 24 may also include a frictional converter clutch or bypass clutch 30 which provides a selective frictional coupling between turbine shaft 32 and input shaft 34.

Automatic transmission 16 includes a plurality of input-to-output ratios or gear ratios effected by various gears, indicated generally by reference numeral 36, and associated frictional elements such as clutches, bands, and the like, as well known in the art. Gears 36 provide selective reduction or multiplication ratios between turbine shaft 32 and output shaft 38. Automatic transmission 16 is preferably electronically controlled via one or more shift solenoids, indicated generally by reference numeral 40, and a converter clutch control (CC) 41 to select an appropriate gear ratio based on current operating conditions. Transmission 16 also preferably includes an actuator for controlling pump pressure (PP) 42 (or line pressure), in addition to a shift lever position sensor (PRN) 44 to provide an indication of the operator's selected gear or driving mode, such as drive, reverse, park, etc. A line pressure sensor (LP) 46 can be provided to facilitate closed loop feedback control of the hydraulic line pressure during shifting or ratio changing.

Depending upon the particular application, output shaft 38 may be coupled to one or more axles 48 via a final drive reduction or differential 50 which may include one or more gears, as indicated generally by reference numeral 52. Each axle 48 may include two or more wheels 54 having corresponding wheel speed sensors 56.

In addition to the sensors described above, powertrain 12 preferably includes a plurality of sensors, indicated generally by reference numeral 60, in communication with corresponding input ports 62 of controller 18 to sense or monitor the current operating and ambient conditions of powertrain 12. A plurality of actuators, indicated generally by reference numeral 64, communicate with controller 18 via output ports 66 to effect control of powertrain 12 in response to commands generated by controller 18.

The sensors preferably include a throttle valve position sensor (TPS) 68 which monitors the position of throttle valve 70 which is disposed within intake 72. A mass airflow sensor (MAF) 74 provides an indication of the air mass flowing through intake 72. A temperature sensor (TMP) 76 provides an indication of the engine temperature which may include engine coolant temperature or engine oil temperature, for example.

As also illustrated in FIG. 1, an engine speed sensor (RPM) 80 monitors rotational speed of crankshaft 20. Similarly, a turbine speed sensor 82 monitors the rotational speed of the turbine 28 of torque converter 24. Another rotational speed sensor, vehicle speed sensor (VSS) 84, provides an indication of the speed of output shaft 38 which may be used to determine the vehicle speed based on the ratio of differential 50 and the size of wheels 54. Of course, wheel speed sensors (WS1 and WS2) 56 may be used to provide an indication of the vehicle speed as well.

Depending upon the particular application requirements, various sensors may be omitted or alternative sensors provided which generate signals indicative of related sensed parameters. Values corresponding to ambient or operating conditions may be inferred or calculated using one or more of the sensed parameters without departing from the spirit or scope of the present invention.

An accelerator pedal 58 is manipulated by the driver to control the output of powertrain 12. A pedal position sensor 59 provides an indication of the position of accelerator pedal 58, preferably in the form of counts. In one embodiment, an increasing number of counts indicates a request for increased power output. Preferably, redundant position sensors are used with at least one position sensor having a negative slope such that a decreasing number of counts corresponds to a request for increased power output. A manifold absolute pressure (MAP) sensor, or equivalent, may be used to provide an indication of the current barometric pressure.

Actuators 64 are used to provide control signals or to effect movement of various devices in powertrain 12. Actuators 64 may include actuators for timing and metering fuel (FUEL) 90, controlling ignition angle or timing (SPK) 92, controlling intake/exhaust valve actuators 93 (VCT) to implement variable cam timing, setting the amount of exhaust gas recirculation (EGR) 94, and adjusting the intake air using throttle valve 70 with an appropriate servomotor or actuator (TVA) 96. As described above, automatic transmission 16 may be selectively controlled by controlling transmission pump or line pressure using an appropriate actuator (PP) 42 in combination with shift solenoids (SS1 and SS2) 40 which are used to select an appropriate gear ratio, and a converter clutch actuator or solenoid (CC) 41 used to lock, unlock or control slip of the torque converter clutch 30. Also preferably, a temperature sensor 106 is provided to determine the transmission oil temperature (TOT).

Controller 18 is preferably a microprocessor-based controller which provides integrated control of engine 14 and transmission 16 of powertrain 12. Of course, the present invention may be implemented in a separate engine or transmission controller depending upon the particular application. Controller 18 includes a microprocessor 110 in communication with input ports 62, output ports 66, and computer readable media 112 via a data/control bus 114. Computer readable media 112 may include various types of volatile and nonvolatile memory such as random access memory (RAM) 116, read-only memory (ROM) 118, and keep-alive memory (KAM) 119. These "functional" descriptions of the various types of volatile and nonvolatile storage may be implemented by any of a number of known physical devices including but not limited to EPROMs, EEPROMs, PROMs, flash memory, and the like. Computer readable media 112 include stored data representing instructions executable by microprocessor 110 to implement the method for controlling engine torque according to the present invention.

Figure 2:
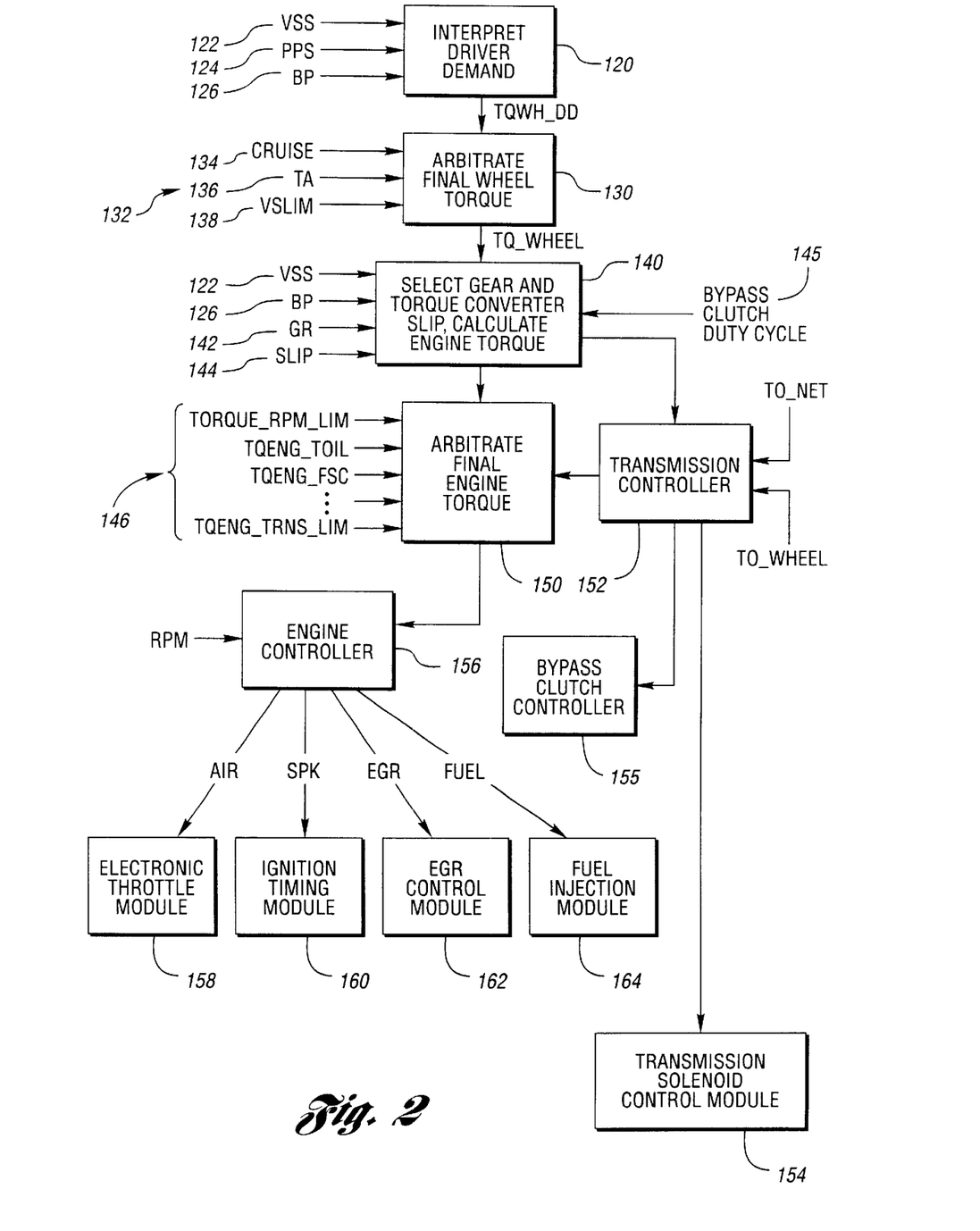
FIG. 2 is a block diagram illustrating an output torque based powertrain control strategy including determination of a desired engine torque according to the present invention.

FIG. 2 provides a block diagram of a representative control architecture for use with a system and method for engine control according to the present invention. As will be understood by one of ordinary skill in the art, one of the advantages of the present invention is its adaptability and robustness to various control architectures and engine technologies. As such, the present invention may be utilized in any of a number of applications and is independent of the particular strategy illustrated for determining a desired engine brake torque and for effecting a requested engine brake torque.

In one embodiment of the present invention, a driver demand is interpreted as represented by block 120 of FIG. 2 based on the vehicle speed 122 accelerator pedal position 124 and barometric pressure 126. In this embodiment, the driver demand is interpreted as a wheel torque (TQWH_DD) and is provided as an input to block 130 which arbitrates the final wheel torque among various other torque requesters, indicated generally by reference numeral 132. Such torque requesters may include, for example, a cruise control torque 134, a traction assist torque 136, and/or a vehicle speed limiting torque 138. Block 130 selects the appropriate torque depending upon the current operating conditions and provides this final wheel torque (TQ_WHEEL) to block 140 which performs a number of functions including scheduling the gear ratio and ratio changes.

Block 140 preferably includes determination of a torque converter slip, and calculation of a desired engine brake torque based on the final desired wheel torque. Inputs used in these determinations include vehicle speed 122, barometric pressure 126, current gear ratio 142, current torque converter slip 144, and bypass clutch duty cycle 145. Determination of the desired engine torque is explained in greater detail below.

The engine torque requested from block 140 is arbitrated with various other engine torque limiting functions 146 as represented by block 150. Transmission controller 152 may also request torque limiting or modulation to provide cancellation of the inertia phase to improve shift feel. Transmission controller 152 communicates with transmission solenoid control module 154 which energizes the appropriate shift solenoids to effect the ratio change. Solenoid control module 154 preferably dynamically controls the line pressure via transmission pump pressure actuator 42 during a ratio change to improve shift feel. Alternatively, the apply and release pressures for individual clutches or shifting elements may be controlled during the ratio change to further improve shift feel. Transmission controller 152 is also in communication with bypass clutch controller 155 which controls the duty cycle of the torque converter bypass clutch to control the state of the clutch.

The final engine torque determined by block 150 is communicated as a desired engine brake torque to engine controller 156, illustrated and described in greater detail with reference to FIG. 3. The engine controller modifies the desired engine brake torque based on current engine operating conditions to determine a requested engine brake torque prior to determination of control parameters such as air flow, spark, EGR, and fuel as represented by blocks 158, 160, 162, and 164, respectively. Various other control parameters may also be used, such as air/fuel ratio, and the like, depending upon the particular application.

While the present invention is described with reference to a system based on desired wheel torque, the present invention is independent of the particular strategy used to determine the desired engine brake torque. For example, the present invention could be easily applied to a system which uses a desired tractive effort or wheel power to determine a desired engine brake torque. Likewise, the present invention is applicable to systems which determine a desired engine brake torque directly from the operator via an accelerator pedal or similar device.

Figure 3:
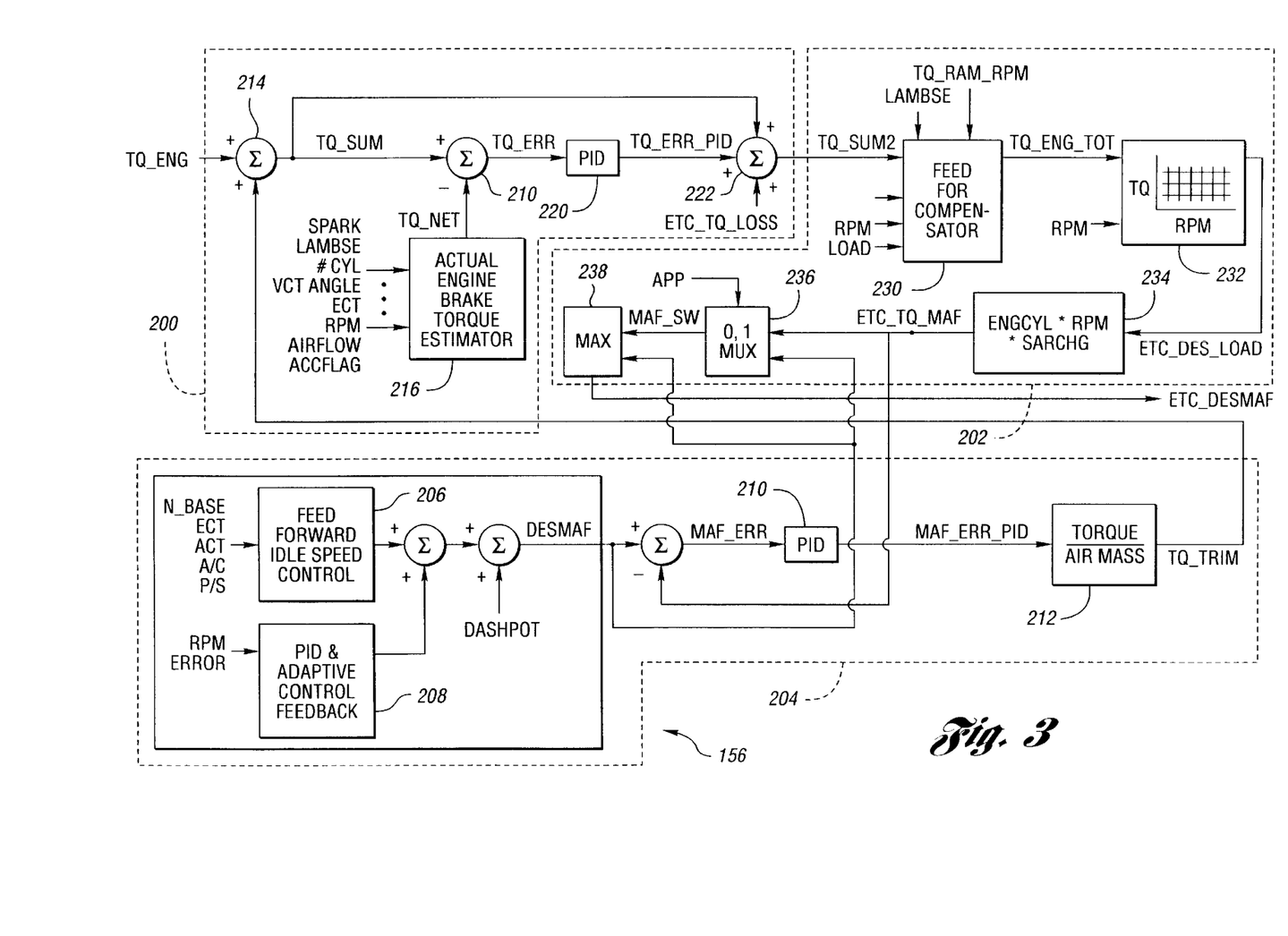
FIG. 3 is a block diagram illustrating an engine torque controller according to the present invention.

FIG. 3 is a block diagram illustrating an engine torque controller 156 according to the present invention. Engine torque controller 156 includes three functional sections represented generally by reference numerals 200, 202, and 204. Block 200 receives a desired engine brake torque (TQ_ENG) and adjusts the desired engine brake torque to generate a requested engine brake torque (TQ_SUM2) based on current operating conditions. The requested engine brake torque is provided to block 202 which controls at least one operating parameter of the engine based on the requested engine brake torque to deliver the desired engine brake torque. Block 204 includes an airflow-based idle speed controller which generates an idle speed torque determined at least in part based on a desired engine speed, preferably stored in a lookup table.

Idle speed controller 204 determines the required airflow to provide idle speed control and dashpot modes of operation. As known in the art, dashpot mode operates to modify the engine deceleration rate to smoothly approach the desired idle speed when the accelerator pedal is released.

Idle speed controller 204 includes a feed forward idle speed control 206 having various inputs including a desired engine idle speed (N_BASE), engine coolant temperature (ECT), air charge temperature (ACT), and flags or switches to determine the state of various accessories such as air conditioning (A/C) and power steering (P/S).

PID and adaptive control feedback block 208 generates an appropriate output based on an RPM error which is combined with the output from block 206 and a dashpot input to determine a desired airflow (DESMAF). This value is provided to section 202 as explained in greater detail below. The desired airflow is also used to generate a torque trim term to provide smooth transitions between idle speed control and other operation modes. The torque trim term is produced by generating an airflow error which is operated on by PID controller 210 to reduce the error toward zero. The airflow value is converted to a torque trim value by block 212 which is then combined with the desired engine brake torque value at summing junction 214. As such, the desired engine brake torque (TQ_ENG) is adjusted or modified first by combining the desired engine brake torque with an idle speed torque (TQ_TRIM) to generate a first intermediate torque (TQ_SUM) according to:

$$TQ\_SUM = TQ\_ENG + TQ\_TRIM$$

The first intermediate torque is compared at block 218 to an actual engine brake torque (TQ_NET) generated by block 216 to generate a torque error (second intermediate torque) according to:

$$TQ\_ERROR = TQ\_SUM - TQ\_NET$$

The actual engine brake torque (TQ_NET) may be an estimated or a measured value for actual torque. The second intermediate torque or torque error is provided to a PID controller 220 which generates a feedback correction torque based on the second intermediate torque.

Preferably, controller 220 includes proportional, integral, and derivative terms but is not active during certain transient torque limiting control modes, which may include idle speed control, dashpot, engine speed limiting, traction assist, transmission gear shifting, and fail safe cooling, among others. In one embodiment, controller 220 sets the proportional and derivative terms to zero while holding the integral term constant during these control modes. Alternatively, the integral term of controller 220 may be reset during transient torque control modes while setting the proportional and derivative terms to zero. The torque feedback controller is preferably deactivated during these transient modes to prevent interference between the control parameters for air and fuel flow and th transient torque control parameters such as spark retard or injector/cylinder cutout. An example of a method for reducing engine torque through coordinated control of spark retard, cylinder cutout, and air/fuel scheduling can be seen in U.S. Pat. No. 5,479,898, for example.

Block 216 preferably provides an estimate of the actual engine brake torque based on current engine operating parameters including ignition angle, air/fuel ratio, number of cylinders, variable CAM timing angle, engine coolant temperature, engine speed, airflow, and operation state of accessories such as the air conditioning compressor. Of course, various other parameters may be included in determining the actual engine brake torque. Alternatively, an appropriate sensor may be provided to directly determine the actual engine brake torque. Determination of an estimated actual torque is described in greater detail in U.S. Pat. No. 5,241,855, assigned to the Assignee of the present invention.

The feedback correction torque generated by PID controller 220 (TQ_PID) is provided to a summing block 222 where it is combined with the first intermediate torque and a third intermediate torque (ETC_TQ_LOSS) to determine the final requested engine brake torque according to:

$$TQ\_ENG\_DES = TQ\_SUM + TQ\_PID + ETC\_TQ\_LOSS$$

The third intermediate torque may represent an accessory brake torque and/or the additional torque required to overcome increased frictional losses during cold engine operation. Preferably, the third intermediate torque is the sum of the estimated accessory brake torques including the air conditioning compressor, front end accessory friction, power steering pump losses, and additional rotational friction attributable to cold engine operation. The output of block 222 is then the requested final engine brake torque which is provided to section 202 to control the engine output. In the embodiment illustrated in FIG. 3, section 202 uses airflow as the primary control parameter. Of course, fuel delivery or fuel flow may also be controlled to control the engine output torque. As such, the input to the torque controller section 202 is compensated to request additional torque to compensate for accessory losses and cold friction losses as opposed to modifying the output of the torque controller as seen in various prior art references.

As stated above, the present invention is independent of the particular strategy or controller used to deliver the requested engine brake torque. In this embodiment, airflow is used as the primary control parameter to deliver the requested torque for stoichiometric operation. Various other operational modes and/or engine technologies, such as lean burn, may utilize airflow control, fuel flow control, spark or ignition angle control, and the like as well known in the art.

Once the requested brake torque is determined by section 200, it is provided to block 230 which provides feed forward compensation to compensate for the non-linear effects of the air/fuel ratio being rich or lean of stoichiometry, i.e., an air/fuel ratio between about 12:1 and about 18:1. Likewise, block 230 compensates for the non-linear effects of the spark or ignition angle being retarded from the steady-state operation conditions, such as when in idle speed control mode. This is considered a feed forward compensation because these terms modify the control input to cause total or partial cancellation of the non-linear functions of the model. Improved transient and steady-state control is provided by combining the feed forward compensation of block 230 with the feedback operation of block 220.

Block 230 includes inputs representing the operating air/fuel equivalence ratio (LAMBSE), spark retard from MBT (SPK_DELTA), engine speed (RPM), and load. A lookup table is used to generate a torque ratio parameter which defines a relationship between indicated torque at a given air/fuel ratio relative to the indicated torque at a stoichiometric air/fuel ratio according to:

$$TQ\_RATIO\_LAMBSE = FN(LAMBSE)$$

This function is described in greater detail in U.S. Pat. No. 5,241,855 assigned to the Assignee of the present invention. Because this function is preferably defined for maximum brake torque (MBT) ignition timing, any variation from MBT requires an additional compensation. The effect of spark retard, such as may occur during idle speed control, is preferably calculated from a tabular function and is represented as a scalar determined according to:

$$TQ\_RATIO\_SPK = FN(SPK\_DELTA)$$

Such a function is described in greater detail in U.S. Pat. No. 5,241,855. Preferably, this value represents the reduction in torque due to an ignition timing which is varied from MBT during steady-state conditions. Thus, the input torque to block 230 (TQ_ENG_DES) can be compensated for the effects of spark retard and lean or rich LAMBSE according to:

$$TQ\_ENG\_TOT = \frac{TQ\_ENG\_DES}{TQ\_RATIO\_LAMBSE * TQ\_RATIO\_SPK}$$

The output of block 230 (TQ_ENG_TOT) is provided to block 232 which converts the torque to a required airflow (load) to achieve the requested value of engine brake torque. Preferably, this model (FNTQETC) is in the form of a lookup table referenced by requested engine brake torque and engine speed. In one embodiment, this model assumes minimal accessory losses, stoichiometric operation, warm engine operation, and standard temperature and pressure calibrations. The output of block 232 is in the form of a desired engine cylinder load which may be represented by:

$$ETC\_DES\_LOAD = FNTZETC(TQ\_ENG\_TOT, RPM)$$

where load is defined as the percentage of maximum theoretical cylinder air mass in the combustion chamber for a naturally aspirated engine (SARCHG).

Block 234 converts the load to a desired intake airflow (ETC_TQ_MAF) according to:

$$ETC\_TQ\_MAF = ETC\_DES\_LOAD * ENGCYL * RPM * SARCHG$$

where ENGCYL represents the number of intake strokes per engine revolution. Block 236 operates as a multiplexer or switch to switch between the real-time controller and the idle speed or dashpot mode control. The appropriate input is selected and passed to the output based on the APP (at part pedal) flag which is set to zero or one when the accelerator pedal is either partly depressed or fully depressed and equal to minus one when the accelerator pedal is not depressed. Block 238 selects the higher value for the airflow from the idle speed controller or the real-time engine torque controller to ensure that the final requested airflow (ETC_DESMAF) does not decrease below the idle speed control setting (DESMAF) due to any modeling errors in the torque-to-load table (FNTQETC) represented by block 232. As such, block 238 always selects the maximum of its two inputs which is then provided at the output.

Figure 4:
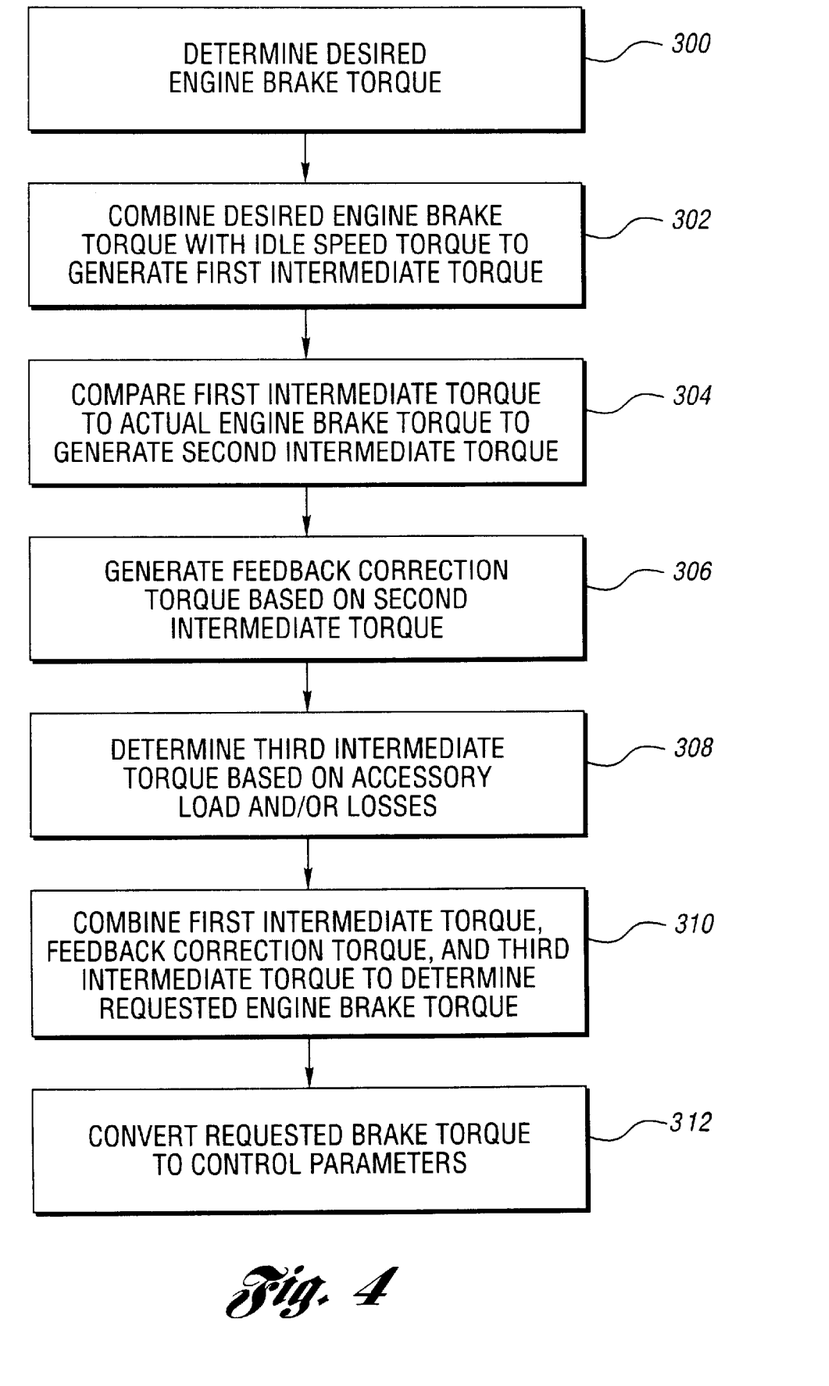
FIG. 4 is a flowchart illustrating a system and method for controlling engine torque according to the present invention.

Referring now to FIG. 4, a flowchart illustrating control logic of one embodiment of a system or method according to the present invention is shown. As will be appreciated by one of ordinary skill in the art, the flowchart illustrated in FIG. 4 may represent any of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Preferably, the control logic is implemented in software which is executed by a microprocessor-based controller. Of course, the control logic may be implemented in software, hardware, or a combination of software and hardware. The flowchart of FIGS. 4 illustrate one "loop" and its operations are preferably repeated at predetermined time intervals as known by those of skill in the art.

Block 300 represents determining a desired engine brake torque. As described above, various techniques may be used to determine the desired engine brake torque. Preferably, the desired engine brake torque is determined based on the vehicle speed, accelerator pedal position, and current barometric pressure. Depending upon the particular application, a driver demanded torque may be represented by a wheel torque, wheel power, engine power, or various other parameters which are converted to a desired engine brake torque. Blocks 302–308 adjust the desired engine brake torque to generate a requested engine brake torque based on current operating conditions. Blocks 310–312 represent controlling at least one of the operating parameters of the engine based on the requested engine brake torque to deliver the desired engine brake torque.

In particular, block 302 represents combining the desired engine brake torque with an idle speed torque to generate a first intermediate torque. Preferably, the idle speed torque is a torque trim value which is used to provide smooth transitions between the idle speed controller and the engine torque controller. The first intermediate torque is compared to the actual engine brake torque to generate a second intermediate torque as represented by block 304. Preferably, the first intermediate torque is also used in a feed forward arrangement as illustrated in FIG. 3 and represented by block 308.

Block 306 represents generating a feedback correction torque based on the second intermediate torque. Preferably, a proportional-integral-derivative (PID) controller is used to generate the feedback correction torque. Preferably, the proportional and derivative terms are set to zero while the integral term is held constant during at least one engine control mode where transient torque control is necessary, such as during idle speed control, traction assist, and the like. The output of the feedback correction torque block is used to adjust the requested engine brake torque to drive the torque error toward zero.

A third intermediate torque based on accessory loads and/or engine frictional losses is determined as represented by block 308. Preferably, block 308 represents determination of an estimated accessory brake torque which includes the torque required to operate various vehicle accessories including an air conditioning compressor, power steering pump, and the like. Various losses may also be compensated for by block 308 including the frictional losses. As known, frictional losses generally vary as a function of engine temperature and engine speed. As such, block 308 preferably includes a term for frictional losses based on engine temperature and engine speed.

The first intermediate torque, feedback correction torque, and third intermediate torque are combined to determine the requested engine brake torque as represented by block 310. The requested engine brake torque is then compensated for the torque reducing effects of spark retard and LAMBSE being rich or lean of stoichiometry. The compensated requested engine brake torque is then provided to block 312 where it is converted to appropriate control parameters to control the engine as represented by block 312. The control parameters may include airflow, fuel, ignition angle (spark), CAM timing, and the like, depending upon the particular application.

As such, the present invention compensates the input to the engine torque controller prior to determination of the control parameters rather than modifying the output of the engine torque controller as described in the prior art. This provides a more robust torque controller which is more easily applied to various engine technologies including lean burn, variable CAM timing, and the like.

While the best mode for carrying out the invention has been described in detail, those familiar with the art to which this invention relates will recognize various alternative designs and embodiments for practicing the invention as defined by the following claims.

What is claimed is:

1. A computer readable storage medium having stored data representing instructions executable by a computer to control an engine, the computer readable storage medium comprising:

instructions for determining a desired engine brake torque based on accelerator pedal position, barometric pressure, and speed;

instructions for adjusting the desired engine brake torque to generate a requested engine brake torque based on current operating conditions; and instructions for controlling at least one operating parameter of the engine based on the requested engine brake torque to deliver the desired engine brake torque.

2. The computer readable storage medium of claim 1 wherein the instructions for adjusting the desired engine brake torque comprise:

instructions for combining the desired engine brake torque with an idle speed torque, the idle speed torque determined at least in part based on a desired engine speed;

instructions for determining an actual engine brake torque; and instructions for comparing the actual engine brake torque to the desired engine brake torque to generate a torque error.

3. The computer readable storage medium of claim 2 wherein the instructions for determining an actual engine brake torque comprise instructions for estimating an actual engine brake torque based on current engine operating parameters.

4. The computer readable storage medium of claim 3 wherein the instructions for adjusting the desired engine brake torque further comprise instructions for generating a requested brake torque based on the torque error to drive the torque error toward zero.

5. The computer readable storage medium of claim 3 wherein the instructions for generating a requested brake torque based on the torque error comprise:

instructions for applying the torque error to a PID feedback controller having associated proportional, integral, and derivative terms; and instructions for setting the proportional and derivative terms to zero and holding the integral term constant during transient torque control modes.

6. The computer readable storage medium of claim 1 wherein the instructions for adjusting the desired engine brake torque comprise:

instructions for combining an accessory brake torque with the desired engine brake torque;

instructions for combining a frictional torque based on engine temperature with the desired engine brake torque;

instructions for compensating for torque reducing effects of spark retard and air/fuel ratio; and wherein the instructions for controlling at least one operating parameter include instructions for controlling at least one of airflow and fuel flow.

7. A computer readable storage medium having stored data representing instructions for controlling an engine, the computer readable storage medium comprising:

instructions for determining a desired engine brake torque; and instructions for modifying the desired engine brake torque based on current engine operating conditions to determine a requested engine brake torque prior to determination of control parameters, including at least one of an airflow and a fuel quantity, to effect the requested engine brake torque by combining the desired engine brake torque with an idle speed torque to generate a first intermediate torque, comparing the first intermediate torque to an actual engine brake torque to generate a second intermediate torque, generating a feedback correction torque based on the second intermediate torque, and combining the first intermediate torque, the feedback correction torque, and a third intermediate torque to determine the requested engine brake torque.

8. The computer readable storage medium of claim 7 wherein the third intermediate torque represents torque required to operate at least one engine accessory.

9. The computer readable storage medium of claim 7 wherein the third intermediate torque varies as a function of temperature and engine speed.

10. A computer readable storage medium having stored data representing instructions executable by a computer to control an internal combustion engine, the computer readable storage medium comprising:
- instructions for determining a desired engine brake torque;
- instructions for adjusting the desired engine brake torque to generate a requested engine brake torque by combining an accessory brake torque with the desired engine brake torque; and
- instructions for controlling at least one operating parameter of the engine based on the requested engine brake torque to deliver the desired engine brake torque.

* * * * *